(12) United States Patent
Komada et al.

(10) Patent No.: US 9,841,350 B2
(45) Date of Patent: Dec. 12, 2017

(54) VEHICLE DRIVE SYSTEM TESTING APPARATUS

(71) Applicant: HORIBA, Ltd., Kyoto (JP)

(72) Inventors: Mineyuki Komada, Kyoto (JP); Hiroyuki Ikeda, Kyoto (JP); Sho Abe, Kyoto (JP)

(73) Assignee: Horiba, Ltd., Kyoto (JP)

( * ) Notice: Subject to any disclaimer, the term of this patent is extended or adjusted under 35 U.S.C. 154(b) by 256 days.

(21) Appl. No.: 14/581,345

(22) Filed: Dec. 23, 2014

(65) Prior Publication Data

US 2015/0185110 A1    Jul. 2, 2015

(30) Foreign Application Priority Data

Dec. 27, 2013  (JP) .................................. 2013-272744

(51) Int. Cl.
*G01M 13/02* (2006.01)
*B60W 10/184* (2012.01)
(Continued)

(52) U.S. Cl.
CPC ......... *G01M 13/025* (2013.01); *B60K 26/021* (2013.01); *B60K 35/00* (2013.01);
(Continued)

(58) Field of Classification Search
CPC .......................... G01M 13/025; G01M 17/00
See application file for complete search history.

(56) References Cited

U.S. PATENT DOCUMENTS

| 5,323,644 A | * | 6/1994 | Schaefer | G01M 17/06 73/116.06 |
| 5,986,545 A | * | 11/1999 | Sanada | G01M 17/00 340/407.1 |

(Continued)

FOREIGN PATENT DOCUMENTS

| CN | 201348567 | 11/2009 |
| CN | 203148676 | 8/2013 |

(Continued)

OTHER PUBLICATIONS

EESR dated Jun. 19, 2015 issued for European patent application No. 14 004 392.8, 7 pgs.
(Continued)

*Primary Examiner* — Peter Macchiarolo
*Assistant Examiner* — Timothy Graves
(74) *Attorney, Agent, or Firm* — Brooks Kushman P.C.

(57) ABSTRACT

This invention is directed to a testing apparatus for testing a vehicle drive system by connecting load devices to the vehicle drive system, wherein the testing apparatus includes a handle operation amount input part for inputting a handle operation amount corresponding to a handle operation of a vehicle, an accelerator operation amount input part for inputting an accelerator operation amount corresponding to an accelerator operation of the vehicle, a brake operation amount input part for inputting a brake operation amount corresponding to a brake operation of the vehicle, and a control part for controlling the load devices based on the operation amounts simultaneously inputted by at least two of the handle operation amount input part, the accelerator operation amount input part and the brake operation amount input part.

5 Claims, 2 Drawing Sheets

(51) Int. Cl.
  *B60W 10/18* (2012.01)
  *B60W 50/14* (2012.01)
  *B60W 10/02* (2006.01)
  *B60K 26/02* (2006.01)
  *B60K 35/00* (2006.01)
  *B60L 15/20* (2006.01)
  *B60L 7/26* (2006.01)

(52) U.S. Cl.
  CPC .. *B60K 2026/025* (2013.01); *B60K 2026/029* (2013.01); *B60K 2350/1064* (2013.01); *B60L 7/26* (2013.01); *B60L 15/20* (2013.01); *B60L 15/2009* (2013.01); *B60L 2250/24* (2013.01); *B60L 2260/26* (2013.01); *B60W 10/02* (2013.01); *B60W 10/18* (2013.01); *B60W 10/184* (2013.01); *B60W 2050/146* (2013.01); *B60W 2540/04* (2013.01); *B60W 2540/10* (2013.01); *B60W 2540/103* (2013.01); *B60W 2540/12* (2013.01); *B60W 2710/083* (2013.01); *Y10T 74/20018* (2015.01); *Y10T 477/33* (2015.01); *Y10T 477/347* (2015.01); *Y10T 477/745* (2015.01); *Y10T 477/75* (2015.01)

(56) References Cited

U.S. PATENT DOCUMENTS

| 6,457,351 B1 * | 10/2002 | Yamamoto | G01M 17/0072 73/116.05 |
|---|---|---|---|
| 2013/0030720 A1 * | 1/2013 | Schulte | G01M 17/06 702/41 |
| 2013/0283900 A1 | 10/2013 | Engstrom et al. | |

FOREIGN PATENT DOCUMENTS

| EP | 2246686 A1 | 11/2010 |
| JP | 2004-020401 A | 1/2004 |
| JP | 2005-083848 | 3/2005 |
| JP | 2005-274323 A | 10/2005 |
| JP | 2006-170741 | 6/2006 |
| JP | 2011-038929 A | 2/2011 |

OTHER PUBLICATIONS

Office Action dated Jul. 6, 2017 issued for Japanese patent application No. 2013-272744, 3 pgs.

* cited by examiner

VEHICLE DRIVE SYSTEM TESTING APPARATUS

CROSS-REFERENCE TO RELATED APPLICATION

This application claims priority to JP Application No. 2013-272744, filed Dec. 27, 2013, the disclosure of which is incorporated in its entirety by reference herein.

TECHNICAL FIELD

The present invention relates to a vehicle drive system testing apparatus for testing a vehicle drive system such as a power train that transmits an engine to be mounted on a vehicle or a power of the engine to a wheel.

BACKGROUND ART

As a conventional vehicle drive system testing apparatus, as shown in JP2006-170741A, a load device such as a dynamometer is coupled to an output shaft of a power train and the load device is controlled by a control device to thereby simulate a load in an actual running to perform a test of the power train.

In this arrangement, the control of the load device by the control device is performed by inputting load data of a predetermined running model obtained by simulating an actual running. This load data is, for example, time-series data of a running resistance acting on a tire in an actual running and this load data is stored in an internal memory, an external memory and so forth of the control device. In the case of performing a test under a specific condition, the test is performed by inputting the condition using, for example, a keyboard or a mouse provided in the control device.

However, in a test using previously stored load data, it is difficult to change a test condition and it is necessary to change the load data in order to change a test condition. This results in bad usability for a user wishing to instantly change the test condition.

Meanwhile, in the case of inputting a specific test condition using, for example, a keyboard, mouse and the like, it is difficult to continuously change a test condition and the input of the condition becomes complicated. Further, since numeric values are inputted, there is a problem that a relationship with respect to an actual running (a relationship with respect to a handle operation, brake operation or accelerator operation) is difficult to understand.

SUMMARY OF INVENTION

Technical Problem

Therefore, the present invention has been made in order to solve the above problems, and an essential object thereof is to provide a vehicle drive system testing apparatus with good usability for a user while facilitating intuitive understanding of a relationship between a handle operation and an accelerator operation or a brake operation in an actual running and allowing to simultaneously input a plurality of operating amounts thereof.

Solution to Problem

That is, a vehicle drive system testing apparatus according to in one aspect of the present invention is adapted to test a vehicle drive system by connecting a load device to the vehicle drive system and applying a load to the vehicle drive system. This vehicle drive system testing apparatus includes:

a handle operation amount input part for inputting a handle operation amount corresponding to a handle operation of a vehicle;

an accelerator operation amount input part for inputting an accelerator operation amount corresponding to an accelerator operation of the vehicle;

a brake operation amount input part for inputting a brake operation amount corresponding to a brake operation of the vehicle; and a control part for controlling the load device based on the operation amounts simultaneously inputted by at least two of the handle operation amount input part, accelerator operation amount input part and brake operation amount input part.

With this configuration, since the control part controls the load device based on operation amounts simultaneously inputted by at least two of the handle operation amount input part, accelerator operation amount input part and brake operation amount input part, the vehicle drive system can be tested while the operation amounts corresponding to the handle operation and the accelerator operation or brake operation in an actual running are simultaneously inputted by the handle operation amount input part, accelerator operation amount input part and brake operation amount input part. Thus, it becomes possible to provide the vehicle drive system testing apparatus with good usability for a user by facilitating intuitive understanding of a relationship between the handle operation and the accelerator operation or the brake operation in an actual running while allowing to simultaneously input these plurality of operating amounts. For example, the vehicle drive system can be tested while inputting a complex driving operation (driving condition) that is a combination of an operation of turning the handlebars and an operation of stepping on the brake or stepping on the accelerator and further continuously changing the driving operations thereof.

In order to be able to input a driving condition in the same sense as an actual vehicle, it is preferable that the handle operation amount input part includes a steering wheel, the accelerator operation amount input part includes an accelerator pedal and the brake operation amount input part includes a brake pedal.

In the case where the vehicle drive system includes a manual transmission, it is preferable that the vehicle drive system testing apparatus further includes a clutch operation amount input part for inputting a clutch operation amount corresponding to a clutch operation of the vehicle.

As a specific aspect for carrying out the present invention, it is preferable that a first load device is connected to a first output shaft to which one of left and right wheels or one of front and rear wheels is connected and a second load device is connected to a second output shaft to which the other of the left and right wheels or the other of the front and rear wheels is connected in the vehicle drive system, and the control part controls the first load device and the second load device based on the handle operation amount so as to simulate a revolution number difference and/or torque difference caused between the two wheels.

Specifically, in the testing apparatus of the vehicle drive system including the first and second output shafts to which the left and right wheels are respectively connected, it is possible to simulate a revolution number difference and/or torque difference caused by a speed difference (revolution number difference) between the left wheel and the right wheel in accordance with a handle operation amount (steering angle). Further, in the testing apparatus of the vehicle drive system including the first and second output shafts to which the front and rear wheels are respectively connected, it is possible to simulate a revolution number difference and/or torque difference caused by an inner wheel difference between the front wheel and the rear wheel in accordance with a handle operation amount (steering angle).

Advantageous Effects of Invention

According to the present invention configured as described above, since at least two of the handle operation, brake operation and accelerator operation are allowed to be simultaneously inputted, it becomes possible to provide the vehicle drive system testing apparatus with good usability for a user by facilitating intuitive understanding of a relationship between the handle operation and the accelerator operation or the brake operation in an actual running while allowing to simultaneously input these plurality of operating amounts.

DESCRIPTION OF EMBODIMENTS

The following describes one embodiment of a vehicle drive system testing apparatus according to the present invention with reference to the accompanying drawings.

A vehicle drive system testing apparatus 100 of the present embodiment is intended to perform a test of a power train (also referred to as "drive line") such as a transmission (manual, automatic or CVT), differential gear, axle and a drive shaft.

Here, a vehicle drive test includes: a gear change/gear synchro test; a shift calibration of an automatic transmission; check of main components (such as a clutch, torque converter, differential gear, power unit, damper, electronic control device, suspension and exhaust system); an endurance test/life test of a drive system and drive system components; a noise/vibration test; a performance/efficiency test; a functional test, and the like.

Figure 1:
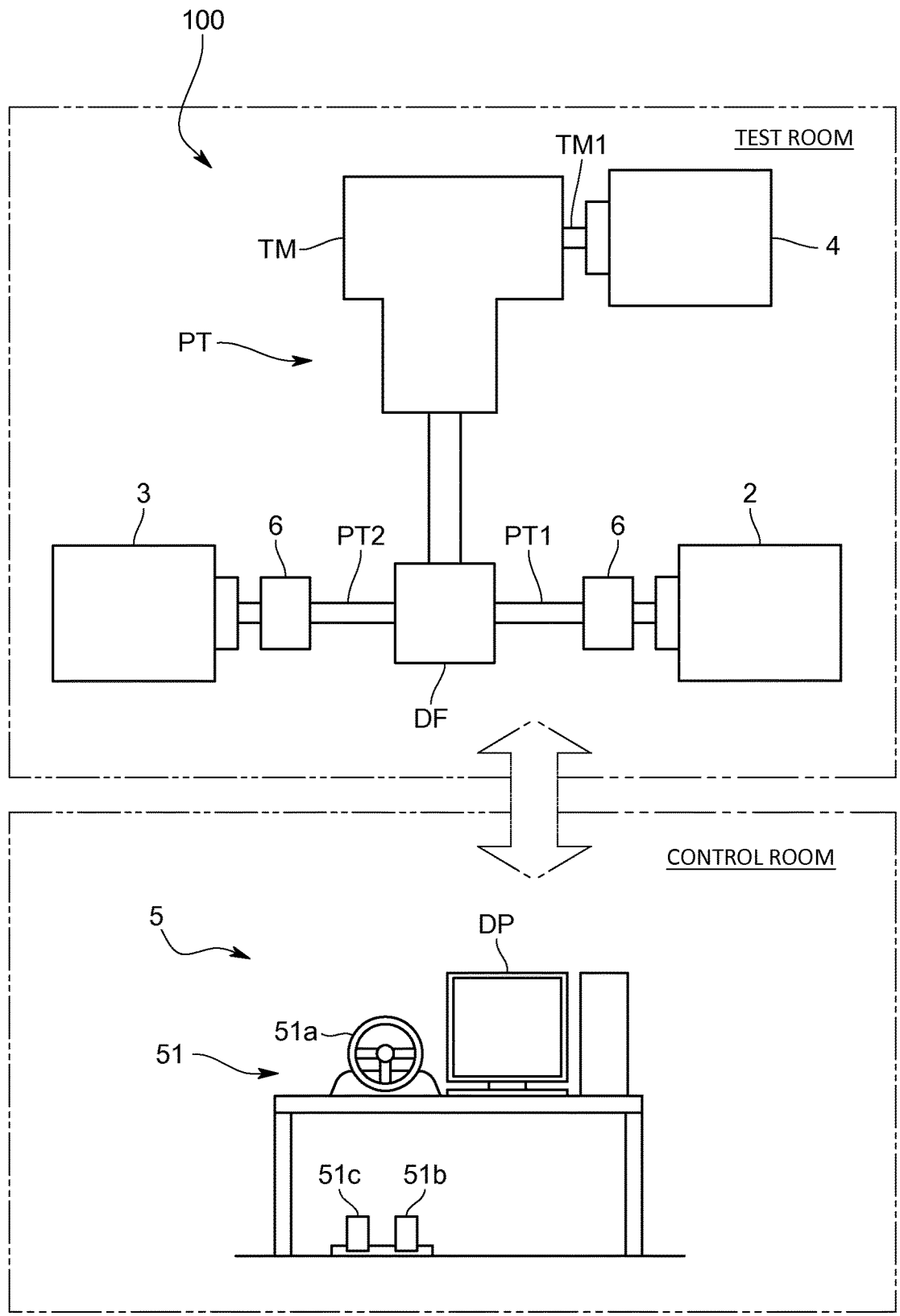
FIG. 1 is a schematic diagram showing a configuration of a vehicle drive system testing apparatus of the present embodiment.

Specifically, as shown in FIG. 1, this vehicle drive system testing apparatus 100 is provided with: a first load device 2 and a second load device 3 respectively coupled to a first output shaft PT1 and a second output shaft PT2 of the power train PT; a drive device 4 coupled to an input side of the power train PT (specifically, an input shaft TM1 of the transmission); and a control device 5 for controlling each of the load devices 2 and 3 and the drive device 4. Note that the following describes a testing apparatus of the power train PT including an automatic transmission or CVT. The power train PT serving as a test specimen, each of the load devices 2 and 3 and the drive device 4 are arranged in a test room, and the control device 5 is arranged in a control room separated from the test room.

The first load device 2 and the second load device 3 are intended to simulate a running resistance acting on wheels connected to each of the output shafts PT1 and PT2, and each of the first and second load devices 2 and 3 is configured of an absorption dynamometer (respectively, referred to as "first absorption dynamometer 2 and second absorption dynamometer 3" in distinction, hereinafter). Here, the two output shafts PT1 and PT2 are the shafts which are connected to each other via the differential gear DF, and one of the left and right wheels is to be connected to the first output shaft PT1 and the other of the left and right wheels is to be connected to the second output shaft PT2. Further, the drive device 4 is intended to simulate a behavior of an engine and this drive device 4 is configured of a drive dynamometer.

Figure 2:
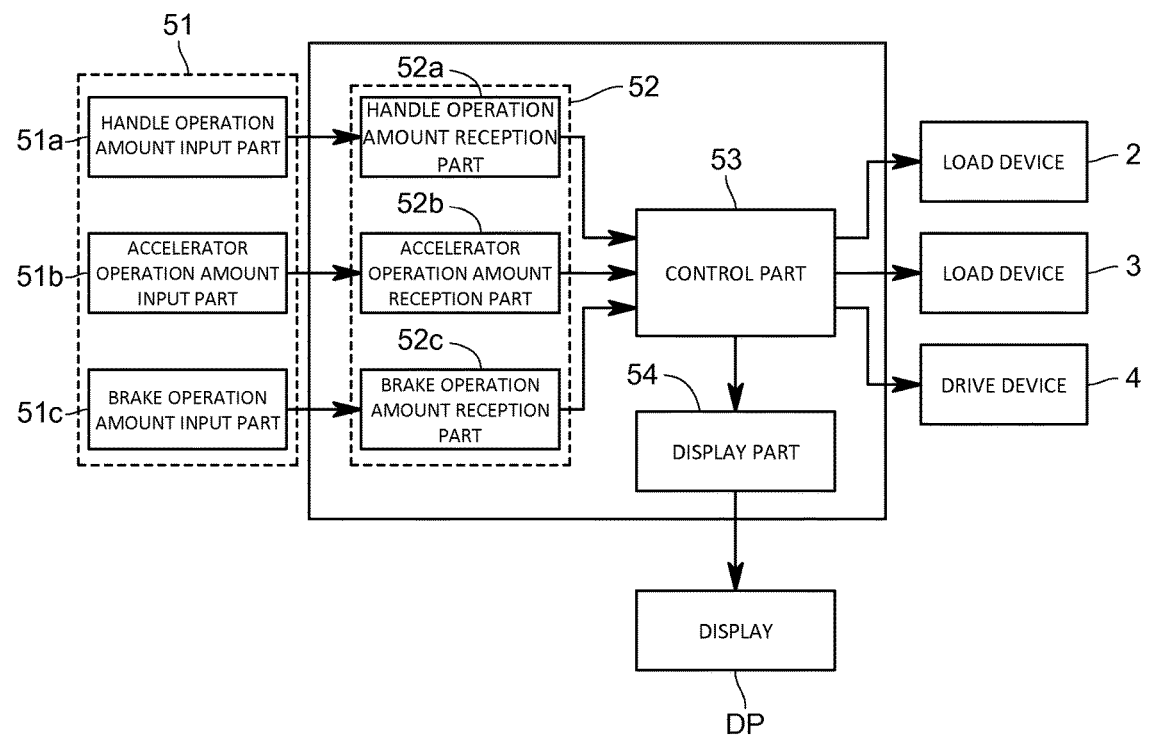
FIG. 2 is a diagram showing a functional configuration of a control device of the same embodiment.

The control device 5 is intended to control the first absorption dynamometer 2, second absorption dynamometer 3 and drive dynamometer 4 under a predetermined condition. As shown in FIG. 2, this control device 5 is provided with: an input part 51 for inputting an operation amount corresponding to a handle operation, an accelerator operation and a brake operation of the vehicle; a reception part 52 for receiving the input from the input part 51; a control part 53 for controlling each of the dynamometers 2 to 4 based on each of the operation amounts received by the reception part 52; and a display part 54 for displaying operation contents of the operation amounts and the like received by the reception part 52 and such as control contents of each of the dynamometers 2 to 4 controlled by the control part 53 on a display DP. Note that this control device 5 implemented by a dedicated or general-purpose computer equipped with: a CPU; an internal memory; an AD converter; an input/output interface; inputting means such as a mouse, keyboard or the like; and display means such as the display DP and the like.

As shown in FIG. 1, the input part 51 includes: a handle operation amount input part 51a for inputting a handle operation amount corresponding to a handle operation of the vehicle; an accelerator operation amount input part 51b for inputting an accelerator operation amount corresponding to an accelerator operation of the vehicle; and a brake operation amount input part 51c for inputting a brake operation amount corresponding to a brake operation of the vehicle. In this configuration, the input part 51 may also include a shift lever operation input part for inputting a shift lever (select lever) operation.

The handle operation amount input part 51a is a handle controller including a steering wheel that simulates an actual steering wheel of the vehicle and it is configured to output an output signal based on a rotation angle (steering angle) from a neutral rotation position. This handle operation amount input part 51a is placed on, for example, a desk top plate and manually operated by an operator.

The accelerator operation amount input part 51b includes an accelerator pedal that simulates an actual accelerator pedal of the vehicle and it is configured to output an output signal based on a stepping amount of the accelerator pedal.

The brake operation amount input part 51c includes a brake pedal that simulates an actual brake pedal of the vehicle and it is configured to output an output signal based on a stepping amount of the brake pedal.

In the present embodiment, the accelerator operation amount input part 51b and the brake operation amount input part 51c are integrally mounted on a common base member. For example, these parts 51b and 51c are placed under a desk and operated by a foot of an operator.

The reception part 52 includes: a handle operation amount reception part 52a for receiving an output signal of an operation amount from the handle operation amount input part 51a; an accelerator operation amount reception part 52b for receiving an output signal of an operation amount from the accelerator operation amount input part 51b; and a brake operation amount reception part 52c for receiving an output signal of an operation amount from the brake operation amount input part 51*c*. Note that, in the case of including the shift lever (select lever), the reception part 52 includes a shift lever operation reception part for receiving an output signal indicative of an operation of the shift lever. Each of these reception parts 52*a* to 52*c* outputs each of the received output signals to the control part 53.

The control part 53 is configured to control the absorption dynamometers 2 and 3 and the drive dynamometer 4 based on the operation amounts simultaneously inputted by at least two of the handle operation amount input part 51*a*, accelerator operation amount input part 51*b* and brake operation amount input part 51*c*.

Specifically, the control part 53 inputs a control signal indicative of a torque command value or a revolution number command value to the absorption dynamometers 2 and 3 and the drive dynamometer 4 based on the operation amounts simultaneously inputted by at least two of the handle operation amount input part 51*a*, accelerator operation amount input part 51*b* and brake operation amount input part 51*c*. For example, the control part 53 inputs a command value to the drive dynamometer 4 based on the accelerator operation amount (stepping amount of the accelerator pedal) inputted by the accelerator operation amount input part 51*b*. Similarly, the control part 53 inputs command values to the absorption dynamometers 2 and 3 based on the accelerator operation amount and the handle operation amount (steering angle of the handle) inputted by the handle operation amount input part 51*a*.

Thus, in the present embodiment, the control part 53 sets the command values to the left and right absorption dynamometers 2 and 3 so as to simulate a revolution number difference and/or torque difference caused by a speed difference (revolution number difference) between the left and right wheels based on the handle operation amount (steering angle of the handle) inputted by the handle operation amount input part 51*a*. More specifically, the control part 53 inputs the command values to be inputted to the left and right two dynamometers 2 and 3 with a revolution number difference and/or torque difference therebetween based on the handle operation amount. In this arrangement, a relationship between the handle operation amount and the revolution number difference and/or torque difference at a command value is preset and relationship-associated data indicative of the relationship is stored in an internal memory or external memory. Thus, the control part 53 sets the command values to be inputted to the left and right absorption dynamometers 2 and 3 based on the handle operation amount inputted by the handle operation amount input part 51*a* and the relationship-associated data.

As the relationship-associated data, it may be considered to associate a predetermined relationship with the command values to be inputted to the left and right absorption dynamometers 2 and 3 in accordance with the handle operation amount irrespective of the accelerator operation amount (accelerator stepping amount) or the brake operation amount (brake stepping amount). Here, the predetermined relationship implies that, for example, a ratio of the revolution numbers and/or torques to be inputted to the left and right dynamometers is proportionally increased (or decreased) or the difference therebetween is increased as the handle operation amount is increased, and so on. Further, as the relationship-associated data, it may be also considered to associate a predetermined relationship with the command values to be inputted to the left and right absorption dynamometers 2 and 3 using the accelerator operation amount (accelerator stepping amount) or the brake operation amount (brake stepping amount) in addition to the handle operation amount as parameters.

The operation contents such as each of the operation amounts and the like inputted by the handle operation amount input part 51*a*, accelerator operation amount input part 51*b*, brake operation amount input part 51*c* and the like in this way are displayed on the display device. By displaying each of the operation contents and the like on the display device in this way, an operator can operate each of the operation amount input parts 51*a* to 51*c* so that, for example, the operation amount becomes a predetermined operation amount such that the operation amount is kept constant and the like while monitoring the operation contents displayed on the display device.

In addition, the control part 53 can also control each of the dynamometers 2 to 4 based on load data of a predetermined running model previously stored in the internal memory or external memory of the control device 5. Here, the load data of the predetermined running model is the data obtained by simulating an actual running, for example, time-series data of a running resistance acting on a tire in the actual running. Further, the control part 53 can also control each of the dynamometers 2 to 4 based on specific test conditions inputted by input means such as a keyboard or a mouse by a user.

In the vehicle drive system testing apparatus 100 configured like this, a torque meter 6 (or a revolution number meter) is attached to a coupling shaft coupled to each of the output shafts PT1 and PT2 of the power train PT or each of the output shafts PT1 and PT2 of the absorption dynamometers 2 and 3, and a test of the power train PT is performed using the output value of the from the torque meter 6 (or the revolution number meter).

According to the vehicle drive system testing apparatus 100 configured like this, since the control part 53 controls each of the dynamometers 2 to 4 based on the operation amounts simultaneously inputted by at least two of the handle operation amount input part 51*a*, accelerator operation amount input part 51*b* and brake operation amount input part 51*c*, the vehicle drive system can be tested while simultaneously inputting the operation amounts corresponding to the handle operation, accelerator operation or brake operation in an actual running by the handle operation amount input part 51*a*, accelerator operation amount input part 51*b* and brake operation amount input part 51*c*. Thus, it is possible to make the vehicle drive system testing apparatus with good usability for a user while facilitating intuitive understanding of a relationship between a handle operation and an accelerator operation or a brake operation in an actual running and allowing to simultaneously input the plurality of operating amounts thereof. For example, the vehicle drive system (power train) can be tested while inputting a complex driving operation (driving condition) that is a combination of an operation of turning the handlebars and an operation of stepping on the brake or stepping on the accelerator and further continuously changing the driving operations thereof.

Further, since the handle operation amount input part 51*a* includes the steering wheel, the accelerator operation amount input part 51*b* includes the accelerator pedal and the brake operation amount input part 51*c* includes the brake pedal, the work of largely changing each of the operation amounts is extremely easy. That is, referring to the handle operation amount input part 51*a*, it is possible to continuously (analogously) change from a state of turning to the right to a state of instantaneously turning to the left. Referring to the accelerator operation amount input part 51*b*, it is possible to continuously (analogously) perform the operation of largely stepping (kicking down) the accelerator pedal. Referring to the brake operation amount input part 51*c*, it is possible to continuously (analogously) perform the operation of largely stepping (suddenly braking) the brake pedal.

Note that the present invention should not be limited to the above embodiment.

For example, in the embodiment, although the description is made as to an aspect of performing a test of the power train PT while inputting a power to the power train PT using the drive dynamometer 4, it may be also possible to perform a test of the power train PT or a test of such as fuel efficiency of an actual engine while inputting a power to the power train PT using the actual engine.

Further, in the case where the power train PT includes a manual transmission, it may be also possible to further include a clutch operation amount input part for inputting a clutch operation amount for operating the clutch of the manual transmission.

Further, although the load device of the embodiment uses the absorption dynamometer, the other absorption motor may be used.

Moreover, in the embodiment, although the load devices 2 and 3 are respectively coupled to the two output shafts PT1 and PT2 which are connected to the left and right two wheels serving as drive wheels, it may be also possible to couple the load devices to the two output shafts which are respectively coupled to the front and rear two wheels to perform a test. In this case, the control part 53 sets the command values to the front and rear load devices so as to simulate a revolution number difference and/or torque difference caused by an inner wheels difference between the front wheel and the rear wheel based on the handle operation amount (steering angle of the handle) inputted by the handle operation amount input part 51*a*. More specifically, the control part 53 inputs the command values to be inputted to the front and rear two load devices with a revolution number difference and/or torque difference therebetween based on the handle operation amount. Further, it may be also possible to respectively couple the load devices to four output shafts to which the front and rear and left and right four wheels are connected.

In addition, the handle operation amount of the present embodiment may be associated with a gradient change of a road surface on which a vehicle runs. That is, it may be configured so that the gradient is changed to a plus (ascending) side when turning the handlebar to the right and the gradient is changed to a minus (descending) side when turning the handlebar to the left. With this configuration, gradient conditions can be easily inputted by simply operating the steering wheel and also the gradient can be continuously changed.

In addition, the present invention is not limited to the above embodiments and it is needless to say that various modifications thereof can be made in a range without departing from the spirit thereof.

REFERENCE SIGNS LIST

100 . . . Vehicle drive system testing apparatus
PT . . . Vehicle drive system (power train)
TM . . . Transmission
2 . . . First load device (absorption dynamometer)
3 . . . Second load device (absorption dynamometer)
4 . . . Drive device (drive dynamometer)
51*a* . . . Handle operation amount input part
51*b* . . . Accelerator operation amount input part
51*c* . . . Brake operation amount input part
52*a* . . . Handle operation amount reception part
52*b* . . . Accelerator operation amount reception part
52*c* . . . Brake operation amount reception part
53 . . . Control part

What is claimed is:

1. A vehicle drive system testing apparatus adapted to test a vehicle drive system, comprising:
a load device connected to the vehicle drive system and applying a load to the vehicle drive system, wherein the load device includes a first load device connected to a first output shaft to which a first wheel is connected and a second load device connected to a second output shaft to which a second wheel is connected, and wherein the first and second wheels are left and right wheels respectively or front and rear wheels respectively;
a handle operation amount input part for inputting a handle operation amount corresponding to a handle operation of a vehicle;
an accelerator operation amount input part for inputting an accelerator operation amount corresponding to an accelerator operation of the vehicle;
a brake operation amount input part for inputting a brake operation amount corresponding to a brake operation of the vehicle; and
a control part for simulating a revolution number difference or a torque difference between the first and second wheels by controlling the load device based on the operation amounts simultaneously inputted by at least two of the handle operation amount input part, the accelerator operation amount input part, and the brake operation amount input part, wherein the controlling includes setting, using a relationship-associated data indicated relationship between the handle operation amount and the revolution number difference or between the handle operation amount and the torque difference, a first command value to be input to the first load device and a second command value to be input to the second load device.

2. The vehicle drive system testing apparatus according to claim 1, wherein the handle operation amount input part includes a steering wheel, the accelerator operation amount input part includes an accelerator pedal and the brake operation amount input part includes a brake pedal.

3. The vehicle drive system testing apparatus according to claim 1 further comprising a clutch operation amount input part for inputting a clutch operation amount corresponding to a clutch operation of the vehicle.

4. A vehicle drive system testing control device for use in a vehicle drive system testing apparatus adapted to test a vehicle drive system by connecting a load device to the vehicle drive system and applying a load to the vehicle drive system, wherein the load device includes a first load device connected to a first output shaft to which a first wheel is connected and a second load device connected to a second output shaft to which a second wheel is connected, and wherein the first and second wheels are left and right wheels respectively or front and rear wheels respectively, comprising:
a handle operation amount input part for inputting a handle operation amount corresponding to a handle operation of a vehicle;
an accelerator operation amount input part for inputting an accelerator operation amount corresponding to an accelerator operation of the vehicle;

a brake operation amount input part for inputting a brake operation amount corresponding to a brake operation of the vehicle; and a control part for simulating a revolution number difference or a torque difference between the first and second wheels by controlling the load device based on the operation amounts simultaneously inputted by at least two of the handle operation amount input part, the accelerator operation amount input part, and the brake operation amount input part, wherein the controlling includes setting, using a relationship-associated data indicated relationship between the handle operation amount and the revolution number difference or between the handle operation amount and the torque difference, a first command value to be input to the first load device and a second command value to be input to the second load device.

5. A vehicle drive system testing method for use with a vehicle drive system testing apparatus adapted to test a vehicle drive system by connecting a load device to the vehicle drive system and applying a load to the vehicle drive system, wherein the load device includes a first load device connected to a first output shaft to which a first wheel is connected and a second load device connected to a second output shaft to which a second wheel is connected, and wherein the first and second wheels are left and right wheels respectively or front and rear wheels respectively, the method comprising:

inputting, via a handle operation amount input part, a handle operation amount corresponding to a handle operation of a vehicle;

inputting, via an accelerator operation amount input part, an accelerator operation amount corresponding to an accelerator operation of the vehicle;

inputting, via a brake operation amount input part, a brake operation amount corresponding to a brake operation of the vehicle; and simulating, via a control part, a revolution number difference or a torque difference between the first and second wheels by controlling the load device based on the operation amounts simultaneously inputted by at least two of the handle operation amount input part, the accelerator operation amount input part, and the brake operation amount input part, wherein the controlling includes setting, using a relationship-associated data indicated relationship between the handle operation amount and the revolution number difference or between the handle operation amount and the torque difference, a first command value to be input to the first load device and a second command value to be input to the second load device.

* * * * *